(12) United States Patent
Chang et al.

(10) Patent No.: US 8,503,756 B2
(45) Date of Patent: Aug. 6, 2013

(54) SYSTEM AND METHOD FOR VERIFYING MANUFACTURING CONSISTENCY OF MANUFACTURED ITEMS

(75) Inventors: Chih-Kuang Chang, Taipei Hsien (TW); Xin-Yuan Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 468 days.

(21) Appl. No.: 12/826,694

(22) Filed: Jun. 30, 2010

(65) Prior Publication Data

US 2011/0188730 A1 Aug. 4, 2011

(30) Foreign Application Priority Data

Jan. 29, 2010 (CN) .......................... 2010 1 0300958

(51) Int. Cl.
*G06K 9/00* (2006.01)
*G01B 5/28* (2006.01)

(52) U.S. Cl.
USPC .............................. 382/141; 382/149; 702/35

(58) Field of Classification Search
None
See application file for complete search history.

(56) References Cited

U.S. PATENT DOCUMENTS

| | | | | |
|---|---|---|---|---|
| 4,183,832 A * | 1/1980 | Meunier et al. | ............... | 523/344 |
| 5,006,721 A * | 4/1991 | Cameron et al. | ......... | 250/559.16 |
| 6,047,082 A * | 4/2000 | Rhody et al. | .................. | 382/141 |
| 6,420,698 B1 * | 7/2002 | Dimsdale | ....................... | 250/234 |
| 7,161,685 B1 * | 1/2007 | De Renzis | ..................... | 356/614 |
| 7,586,489 B2 * | 9/2009 | Muller-Fischer et al. | .... | 345/427 |
| 7,602,963 B2 * | 10/2009 | Nightingale et al. | ......... | 382/149 |
| 7,720,647 B2 * | 5/2010 | Chang et al. | ................... | 702/190 |
| 2003/0024315 A1 * | 2/2003 | Merkel et al. | ................... | 73/596 |
| 2004/0001620 A1 * | 1/2004 | Moore et al. | .................. | 382/154 |
| 2004/0254758 A1 * | 12/2004 | Chang | ........................... | 702/155 |
| 2005/0114059 A1 * | 5/2005 | Chang et al. | ................... | 702/84 |
| 2005/0284937 A1 * | 12/2005 | Xi et al. | ......................... | 235/437 |
| 2007/0024620 A1 * | 2/2007 | Muller-Fischer et al. | .... | 345/427 |
| 2007/0253635 A1 * | 11/2007 | Chang et al. | ................... | 382/260 |
| 2008/0043035 A1 * | 2/2008 | Chang et al. | ................... | 345/619 |
| 2008/0075326 A1 * | 3/2008 | Otani et al. | .................... | 382/106 |
| 2009/0048782 A1 * | 2/2009 | Chang et al. | ...................... | 702/5 |
| 2009/0055136 A1 * | 2/2009 | Ilies | ................................. | 703/1 |
| 2009/0063105 A1 * | 3/2009 | Chang et al. | ...................... | 703/1 |

FOREIGN PATENT DOCUMENTS

CN   101581579   11/2009

* cited by examiner

*Primary Examiner* — Mussa A Shaawat
(74) *Attorney, Agent, or Firm* — Altis Law Group, Inc.

(57) ABSTRACT

In a method and system for verifying manufacturing consistency of manufactured items, N point clouds of the manufactured items are read. A first point cloud is selected from the N point clouds, and each point of the first point cloud is projected onto a predetermined ideal outline for obtaining a nearest point in the ideal outline of each point of the first point cloud. Intersections of the N point clouds and each line formed by a point in the first point cloud and the nearest point of the point are further determined, and a vertical distance between each of the intersections and the ideal outline is calculated for obtaining a deviation value of each of the intersections. At least one outline is fitted according to the deviation values of each of the intersections and the at least one fitted outline is output to a display device.

9 Claims, 5 Drawing Sheets

| | |
|---|---|
| >0.20 | Red |
| 0.20~0.15 | Pink |
| 0.15~-0.15 | Green |
| -0.15~-0.20 | Cyan |
| <-0.20 | Blue |

FIG. 5

SYSTEM AND METHOD FOR VERIFYING MANUFACTURING CONSISTENCY OF MANUFACTURED ITEMS

BACKGROUND

1. Technical Field

Embodiments of the present disclosure generally relate to manufactured item measurement, and more particularly, to a system and method for verifying manufacturing consistency of manufactured items.

2. Description of Related Art

Process capability defines the long-term performance level of a process after it has been brought under statistical control, as well as the ability of the combination of people, machines, methods, materials, and measurements to produce a manufactured item that will consistently meet design requirements and customer expectations.

Stability of manufactured items in batch manufactured item production is an important factor to measure process capability. Thus, it is necessary to sample manufactured items from the batch manufactured item production. However, originally, manufactured items are sampled stochastically, thus, they may not be representative. In addition, when measuring process capability using the sampled manufactured items, only sizes of the sampled manufactured items are measured, thus, it is one-sided. Furthermore, a measurement result obtained by measuring the sampled manufactured items is in a number format, thus, it is not visual.

BRIEF DESCRIPTION OF THE DRAWINGS

FIG. 5 shows an example of a color range.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
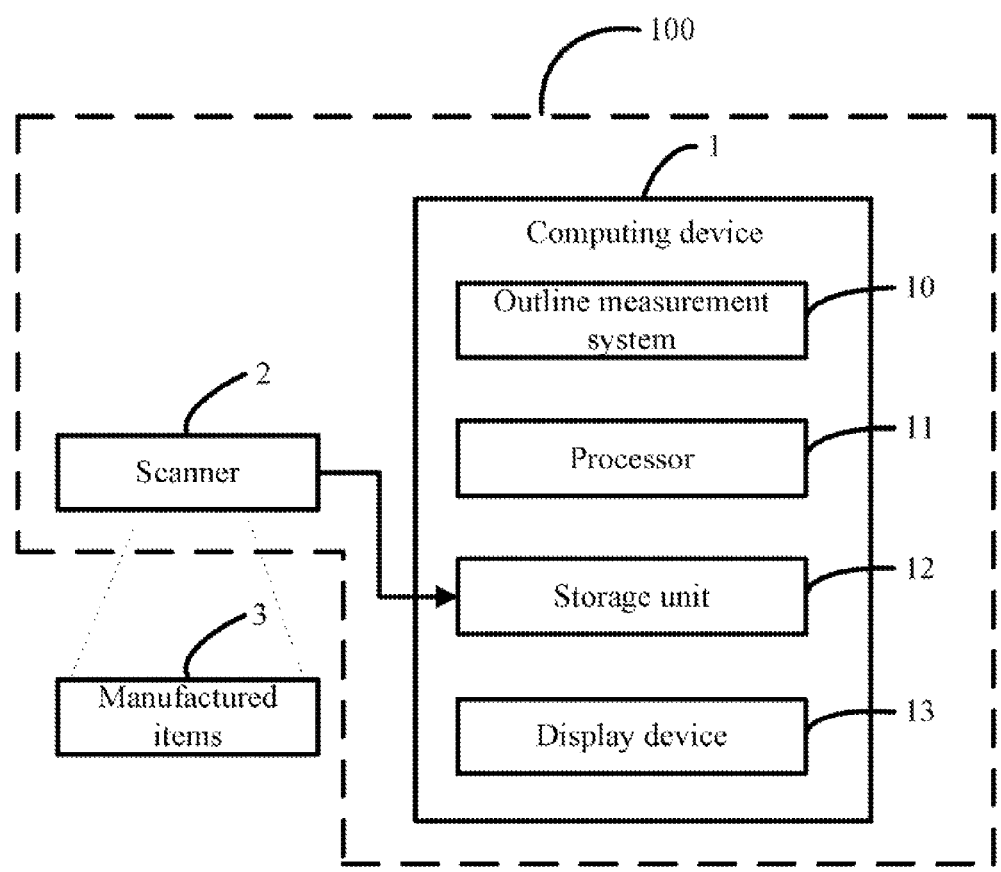
FIG. 1 is a block diagram of one embodiment of a system for verifying manufacturing consistency of manufactured items.

FIG. 1 is a block diagram of one embodiment of a system 100 for verifying manufacturing consistency of manufactured items 3. In one embodiment, the system 100 includes a computing device 1 and a scanner 2. The computing device 1 communicates with the scanner 2 wired or wirelessly. The computing device 1 may be a computer, a server, for example, and the scanner 2 may be a laser scanner for example. The manufactured items 3 are obtained by sampling n manufactured items at regular intervals during a manufactured item production schedule, where n is a positive integer, and may be 2, for example. Thus, N manufactured items 3 in all can be obtained, where N is also a positive integer, and is a multiple of n. N may be 24, for example. The manufactured items 3 may be a computer part, or a shell of a computing device, for example.

The computing device 1 includes an outline measurement system 10, a processor 11, a storage unit 12, and a display device 13. The outline measurement system 10 includes a plurality of functional modules (as described in FIG. 2), to measure the outline of each manufactured item 3, to analyze process capability of the manufactured items 3. The processor 11 can execute one or more computerized codes of the functional modules of the outline measurement system 10. The storage unit 12 stores N point clouds of the N manufactured items 3. In may be understood that a point cloud is a set of vertices in a three-dimensional coordinate system. These vertices are usually defined by X, Y, and Z coordinates. The point cloud is created by the scanner 2. The scanner 2 measures a large number of points on the surface of a manufactured item 3, and outputs the point cloud as a data file to the storage unit 12. The storage unit 12 further stores the one or more computerized codes of the functional modules of the outline measurement system 10. The display device 13 provides a user interface (UI), displaying the measurement of the outlines of the manufactured items 3.

Figure 2:
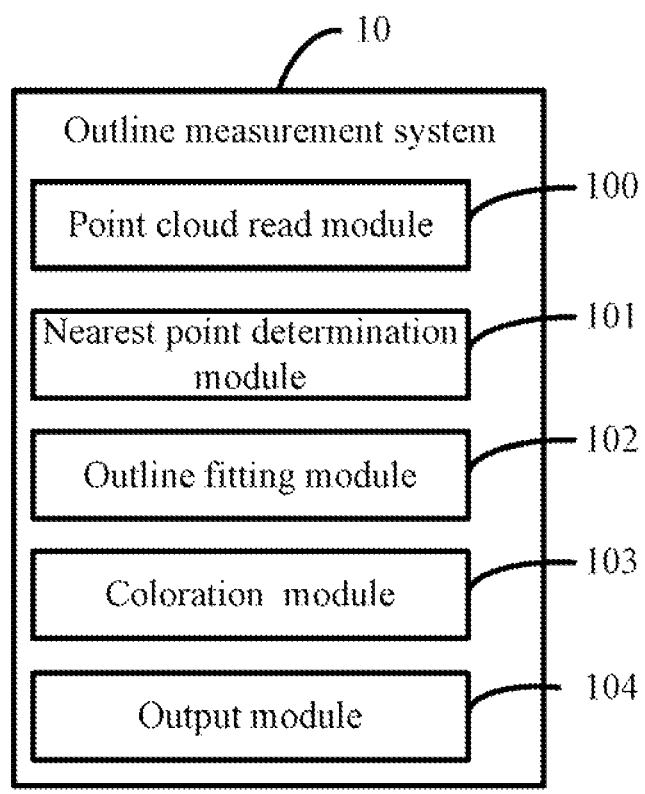
FIG. 2 is a block diagram of functional modules of an outline measurement system of FIG. 1.

FIG. 2 is a block diagram of functional modules of the outline measurement system 10 in FIG. 1. In one embodiment, the outline measurement system 10 includes a point cloud read module 100, a nearest point determination module 101, an outline fitting module 102, a coloration module 103, and an output module 104.

The point cloud read module 100 reads N point clouds from the storage unit 12, and selects a first point cloud from the N point clouds.

Figure 4:
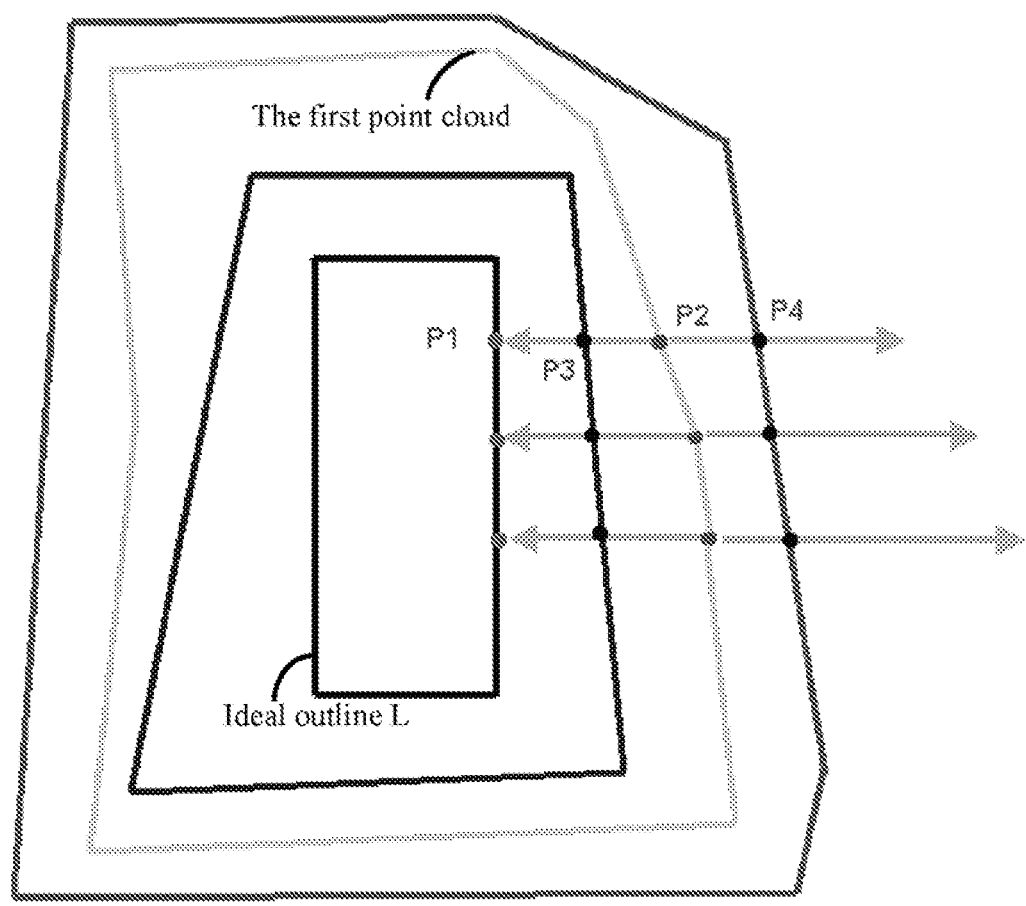
FIG. 4 is a schematic diagram of an example of computing deviation values.

The nearest point determination module 101 projects each point of the first point cloud onto a predetermined ideal outline, for obtaining a nearest point in the ideal outline of each point of the first point cloud. Referring to an example shown in FIG. 4, P2 is a point of the first point cloud, and the nearest point determination module 101 projects P2 onto the predetermined ideal outline L to locate P1, thus, the nearest point of P2 is P1.

The outline fitting module 102 determines intersections of the N point clouds and each line formed by a point in the first point cloud and the nearest point of the point. In the example shown in FIG. 4, the outline fitting module 102 determines intersections of the N point clouds and the line P1P2. It may be seen from FIG. 4 that the intersections of the N point clouds and the line P1P2 include P3, P2, and P4. The outline fitting module 12 further obtains a deviation value of each of the intersections by computing a vertical distance between each of the intersections and the ideal outline. It may be understood that the vertical distance of an intersection is the deviation value of the intersection. The outline fitting module 102 further fits at least one outline according to the deviation values of each of the intersections. In one embodiment, the at least one fitted outline includes an inner outline, a 25% outline, an average outline, a 75% outline, and an outer outline.

In one embodiment, the inner outline is formed by the intersections, each of which is selected from the intersections of the N point clouds and a line formed by a point in the first point cloud and the nearest point of the point, and is the nearest to the ideal outline. In the example shown in FIG. 4, the intersection P3 is selected from the intersections of the N point clouds and the line P1P2, and is the nearest to the ideal outline L. Thus, intersection P3 is one of the intersections that form the inner outline.

In one embodiment, the 25% outline is formed by first new points, each of which is created as follows. The outline fitting module 102 computes the least deviation value of the intersections of the N point clouds and a line formed by a point in the first point cloud and the nearest point of the point, and further computes an average deviation value of the intersections of the N point clouds and a line formed by a point in the first point cloud and the nearest point of the point. The outline fitting module 102 then obtains a sum of the least deviation value and the average deviation value. The outline fitting module 102 further obtains a value by halving the sum. In one embodiment, the outline fitting module 102 creates a first new point by taking the value as the deviation value to the ideal line. In the example shown in FIG. 4, one of the first new points that forms the 25% outline is created according to a value computed by calculating a sum of the deviation value of the intersection P3 and an average deviation value of the intersections P2, P3, and P4, and further halving the sum.

In one embodiment, the average outline is formed by second new points, each of which is created according to an average deviation value of the intersections of the N point clouds and a line formed by a point in the first point cloud and the nearest point of the point. In one embodiment, the outline fitting module 102 creates a second new point by taking the average deviation value as the deviation value to the ideal line. In the example shown in FIG. 4, one of the second new points that forms the average outline is created according to an average deviation value of the intersections P2, P3, and P4.

In one embodiment, the 75% outline is formed by third new points, each of which is created as follows. The outline fitting module 102 computes the maximum deviation value of the intersections of the N point clouds and a line formed by a point in the first point cloud and the nearest point of the point, and further computes an average deviation value of the intersections of the N point clouds and a line formed by a point in the first point cloud and the nearest point of the point. The outline fitting module 102 then obtains a sum of the maximum deviation value and the average deviation value. The outline fitting module 102 further obtains a value by halving the sum. In one embodiment, the outline fitting module 102 creates a third new point by taking the value as the deviation value to the ideal line. In the example shown in FIG. 4, one of the third new points that forms the 75% outline is created according to a value calculated by computing a sum of the deviation value of the intersection P4 and an average deviation value of the intersections P2, P3, and P4, and further halving the sum.

In one embodiment, the outer outline is formed by the intersections, each of which is selected from the intersections of the N point clouds and a line formed by a point in the first point cloud and the nearest point of the point, and is the farthest from the ideal outline. In the example shown in FIG. 4, the intersection P4 is selected from the intersections of the N point clouds and the line P1P2, and is the farthest from the ideal outline L. Thus, intersection P4 is one of the intersections that form the outer outline.

The coloration module 103 compares a deviation value of each point of the at least one fitted outline with a predetermined color range, and colorizes each point of the at least one outline according to the comparison. Referring to an example of the color range shown in FIG. 5, if a deviation value of a point of an outline is 0.21, the coloration module 103 colorizes this point red. If a deviation value of a point of an outline is 0.01, the coloration module 103 colorizes this point green.

The output module 104 outputs a result of the measurement of outlines of the manufactured items 3, that is, the at least one fitted outline, to the display device 13.

Figure 3:
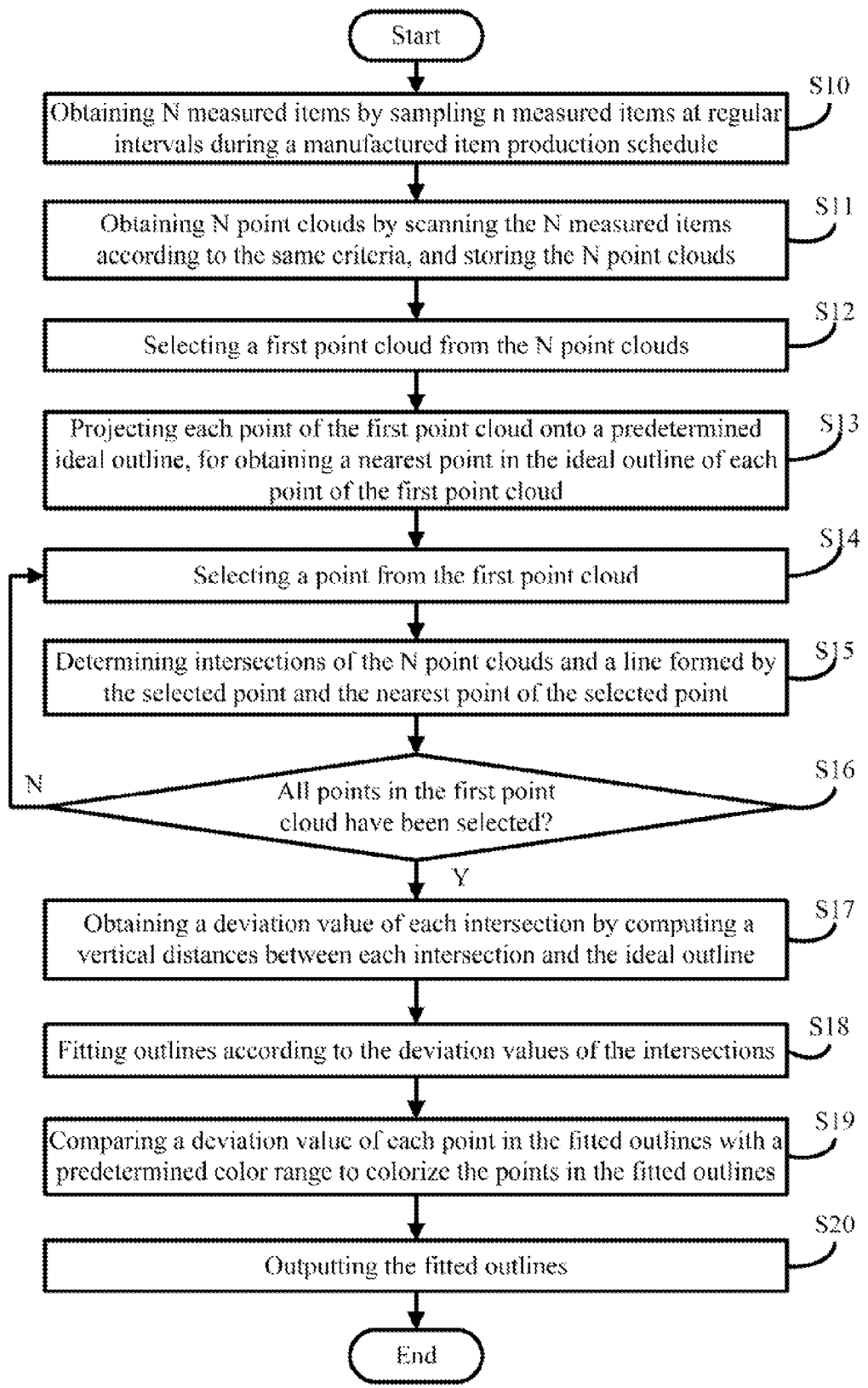
FIG. 3 is a flowchart of one embodiment of a method for verifying manufacturing consistency of manufactured items.

FIG. 3 is a flowchart of one embodiment of a method for verifying manufacturing consistency of manufactured items 3 using a system of FIG. 1. The method can be performed by execution of a computer-readable program code by at least one processor 11 of computing device 1. Depending on the embodiment, additional blocks in the flow of FIG. 3 may be added, others removed, and the ordering of the blocks may be changed.

In block S10, N manufactured items 3 are obtained by sampling n manufactured items 3 at regular intervals during a manufactured item production schedule, where both N and n are positive integers. In an example, the regular interval may be 2 hours, the manufactured item production schedule may be 24 hours, and n may be 2, thus, N is 24.

In block S11, the scanner 2 scans the N manufactured items 3 using the same criteria for obtaining N point clouds, and stores the N point cloud into the storage unit 12.

In block S12, the point cloud read module 100 reads the N point clouds from the storage unit 12, and selects a first point cloud from the N point clouds.

In block S13, the nearest point determination module 101 projects each point of the first point cloud onto a predetermined ideal outline, for obtaining a nearest point in the ideal outline of each point of the first point cloud.

In block S14, the outline fitting module 102 selects a point from the first point cloud. In one embodiment, the selection of the point is random.

In block S15, the outline fitting module 102 determines intersections of the N point clouds and a line formed by the selected point and the nearest point of the selected point.

In block S16, the outline fitting module 12 determines if all points in the first point cloud have been selected. Block S17 is implemented if all points in the first point cloud have been selected. Otherwise, block S14 is repeated if at least one point in the first point cloud has not been selected.

In block S17, the outline fitting module 12 computes a vertical distance between each of the intersections and the ideal outline, so as to obtain a deviation value of each of the intersections. It may be understood that the vertical distance of an intersection is the deviation value of the intersection.

In block S18, the outline fitting module 12 fits at least one outline according to the deviation values of each of the intersections. In one embodiment, the at least one fitted outline includes an inner outline, a 25% outline, an average outline, a 75% outline, and an outer outline.

In one embodiment, the inner outline is formed by the intersections, each of which is selected from the intersections of the N point clouds and a line formed by a point in the first point cloud and the nearest point of the point, and is the nearest to the ideal outline.

In one embodiment, the 25% outline is formed by first new points, each of which is created as follows. The outline fitting module 102 computes the least deviation value of the intersections of the N point clouds and a line formed by a point in the first point cloud and the nearest point of the point, and further computes an average deviation value of the intersections of the N point clouds and a line formed by a point in the first point cloud and the nearest point of the point. The outline fitting module 102 then obtains a sum of the least deviation value and the average deviation value. The outline fitting module 102 further obtains a value by halving the sum. In one embodiment, the outline fitting module 102 creates a first new point by taking the value as the deviation value to the ideal line.

In one embodiment, the average outline is formed by second new points, each of which is created according to an average deviation value of the intersections of the N point clouds and a line formed by a point in the first point cloud and the nearest point of the point. In one embodiment, the outline fitting module 102 creates a second new point by taking the average deviation value as the deviation value to the ideal line.

In one embodiment, the 75% outline is formed by third new points, each of which is created as follows. The outline fitting module 102 computes the maximum deviation value of the intersections of the N point clouds and a line formed by a point in the first point cloud and the nearest point of the point, and further computes an average deviation value of the intersections of the N point clouds and a line formed by a point in the first point cloud and the nearest point of the point. The outline fitting module 102 then obtains a sum of the maximum deviation value and the average deviation value. The outline fitting module 102 further obtains a value by halving the sum. In one embodiment, the outline fitting module 102 creates a third new point by taking the value as the deviation value to the ideal line.

In one embodiment, the outer outline is formed by the intersections, each of which is selected from the intersections of the N point clouds and a line formed by a point in the first point cloud and the nearest point of the point, and is the farthest from the ideal outline.

In block S19, the coloration module 103 compares a deviation value of each point of the at least one fitted outline with a predetermined color range, and colorizes each point of the at least one outline according to the comparison.

In block S20, the output module 104 outputs the at least one fitted outline to the display device 13.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized method for verifying manufacturing consistency of manufactured items, the method being performed by execution of computerized codes by at least one processor of an electronic device, and comprising:
    (a) reading N point clouds of the manufactured items from a storage unit by the at least one processor, wherein N is a positive integer;
    (b) selecting a first point cloud from the N point clouds by the at least one processor;
    (c) projecting each point of the first point cloud onto a predetermined ideal outline, to obtain a nearest point in the ideal outline of each point of the first point cloud by the at least one processor;
    (d) selecting a point from the first point cloud by the at least one processor;
    (e) determining intersections of the N point clouds and a line formed by the selected point and the nearest point of the selected point by the at least one processor;
    (f) repeating (d) and (e) until all points of the first point cloud have been selected by the at least one processor;
    (g) computing a vertical distance between each of the intersections and the ideal outline, to obtain a deviation value of each of the intersections by the at least one processor;
    (h) fitting at least one outline according to the deviation values of each of the intersections by the at least one processor, wherein the at least one fitted outline comprises: an inner outline, a 25% outline, an average outline, a 75% outline, and/or an outer outline, wherein:
        the inner outline is formed by the intersections, each of which is selected from the intersections of the N point clouds and a line formed by a point in the first point cloud and the nearest point of the point, and is the nearest to the ideal outline;
        the 25% outline is formed by first new points, each of which is created by: computing the least deviation value of the intersections of the N point clouds and a line formed by a point in the first point cloud and the nearest point of the point and further computing an average deviation value of the intersections of the N point clouds and a line formed by a point in the first point cloud and the nearest point of the point to obtain a sum of the least deviation value and the average deviation value, obtaining a value by halving the sum, and creating a first new point by taking the value as the deviation value to the ideal line;
        the average outline is formed by second new points, each of which is created by: computing an average deviation value of the intersections of the N point clouds and a line formed by a point in the first point cloud and the nearest point of the point, and creating a second new point by taking the average deviation value as the deviation value to the ideal line;
        the 75% outline is formed by third new points, each of which is created by: computing the maximum deviation value of the intersections of the N point clouds and a line formed by a point in the first point cloud and the nearest point of the point and further computing an average deviation value of the intersections of the N point clouds and a line formed by a point in the first point cloud and the nearest point of the point to obtain a sum of the maximum deviation value and the average deviation value, obtaining a value by halving the sum, and creating a third new point by taking the value as the deviation value to the ideal line; and
        the outer outline is formed by the intersections, each of which is selected from the intersections of the N point clouds and a line formed by a point in the first point cloud and the nearest point of the point, and is the farthest from the ideal outline; and
    (i) outputting the at least one fitted outline to a display device by the at least one processor.

2. The method as described in claim 1, before (a) further comprising:
    obtaining N manufactured items by sampling n manufactured items at regular intervals during a manufactured item production schedule, wherein n is a positive integer by the at least one processor; and
    scanning the N manufactured items using the same criteria for obtaining the N point clouds, and storing the N point cloud into a storage unit by the at least one processor.

3. The method as described in claim 1, after (h) further comprising:
    comparing a deviation value of each point of the at least one fitted outline with a predetermined color range by the at least one processor; and
    colorizing each point of the at least one outline according to the comparison by the at least one processor.

4. A non-transitory storage medium having stored thereon instructions that, when executed by at least one processor of a computing device, cause the computing device to perform a method for verifying manufacturing consistency of manufactured items, the method comprising:

(a) reading N point clouds of the manufactured items, wherein N is a positive integer;
(b) selecting a first point cloud from the N point clouds;
(c) projecting each point of the first point cloud onto a predetermined ideal outline, to obtain a nearest point in the ideal outline of each point of the first point cloud;
(d) selecting a point from the first point cloud;
(e) determining intersections of the N point clouds and a line formed by the selected point and the nearest point of the selected point;
(f) repeating (d) and (e) until all points of the first point cloud have been selected;
(g) computing a vertical distance between each of the intersections and the ideal outline, to obtain a deviation value of each of the intersections;
(h) fitting at least one outline according to the deviation values of each of the intersections, wherein the at least one fitted outline comprises: an inner outline, a 25% outline, an average outline, a 75% outline, and/or an outer outline, wherein:
  the inner outline is formed by the intersections, each of which is selected from the intersections of the N point clouds and a line formed by a point in the first point cloud and the nearest point of the point, and is the nearest to the ideal outline;
  the 25% outline is formed by first new points, each of which is created by: computing the least deviation value of the intersections of the N point clouds and a line formed by a point in the first point cloud and the nearest point of the point and further computing an average deviation value of the intersections of the N point clouds and a line formed by a point in the first point cloud and the nearest point of the point to obtain a sum of the least deviation value and the average deviation value, obtaining a value by halving the sum, and creating a first new point by taking the value as the deviation value to the ideal line;
  the average outline is formed by second new points, each of which is created by: computing an average deviation value of the intersections of the N point clouds and a line formed by a point in the first point cloud and the nearest point of the point, and creating a second new point by taking the average deviation value as the deviation value to the ideal line;
  the 75% outline is formed by third new points, each of which is created by: computing the maximum deviation value of the intersections of the N point clouds and a line formed by a point in the first point cloud and the nearest point of the point and further computing an average deviation value of the intersections of the N point clouds and a line formed by a point in the first point cloud and the nearest point of the point to obtain a sum of the maximum deviation value and the average deviation value, obtaining a value by halving the sum, and creating a third new point by taking the value as the deviation value to the ideal line; and
  the outer outline is formed by the intersections, each of which is selected from the intersections of the N point clouds and a line formed by a point in the first point cloud and the nearest point of the point, and is the farthest from the ideal outline; and
(i) outputting the at least one fitted outline to a display device.

5. The non-transitory storage medium as described in claim 4, before (a) further comprising:

obtaining N manufactured items by sampling n manufactured items at regular intervals during a manufactured item production schedule, wherein n is a positive integer; and
scanning the N manufactured items using the same criterion for obtaining the N point clouds, and storing the N point cloud into a storage unit.

6. The non-transitory storage medium as described in claim 4, after (h) further comprising:
comparing a deviation value of each point of the at least one fitted outline with a predetermined color range; and
colorizing each point of the at least one outline according to the comparison.

7. A system for verifying manufacturing consistency of manufactured items, the system comprising:
  a point cloud read module operable to read N point clouds of the manufactured items from a storage unit, and select a first point cloud from the N point clouds, wherein N is a positive integer;
  a nearest point determination module operable to project each point of the first point cloud onto a predetermined ideal outline, for obtaining a nearest point in the ideal outline of each point of the first point cloud;
  an outline fitting module operable to determine intersections of the N point clouds and each line formed by a point in the first point cloud and the nearest point of the point, obtain a deviation value of each of the intersections by computing a vertical distance between each of the intersections and the ideal outline, and further fit at least one outline according to the deviation values of each of the intersections, wherein the at least one fitted outline comprises: an inner outline, a 25% outline, an average outline, a 75% outline, and/or an outer outline, wherein:
    the inner outline is formed by the intersections, each of which is selected from the intersections of the N point clouds and a line formed by a point in the first point cloud and the nearest point of the point, and is the nearest to the ideal outline;
    the 25% outline is formed by first new points, each of which is created by: computing the least deviation value of the intersections of the N point clouds and a line formed by a point in the first point cloud and the nearest point of the point and further computing an average deviation value of the intersections of the N point clouds and a line formed by a point in the first point cloud and the nearest point of the point to obtain a sum of the least deviation value and the average deviation value, obtaining a value by halving the sum, and creating a first new point by taking the value as the deviation value to the ideal line;
    the average outline is formed by second new points, each of which is created by: computing an average deviation value of the intersections of the N point clouds and a line formed by a point in the first point cloud and the nearest point of the point, and creating a second new point by taking the average deviation value as the deviation value to the ideal line;
    the 75% outline is formed by third new points, each of which is created by: computing the maximum deviation value of the intersections of the N point clouds and a line formed by a point in the first point cloud and the nearest point of the point and further computing an average deviation value of the intersections of the N point clouds and a line formed by a point in the first point cloud and the nearest point of the point to obtain a sum of the maximum deviation value and the average deviation value, obtaining a value by halving the sum, and creating a third new point by taking the value as the deviation value to the ideal line; and the outer outline is formed by the intersections, each of which is selected from the intersections of the N point clouds and a line formed by a point in the first point cloud and the nearest point of the point, and is the farthest from the ideal outline;

an output module operable to output the at least one fitted outline; and a processor that executes the point cloud read module, the nearest point determination module, the outline fitting module, and the output module.

8. The system as described in claim 7, wherein the N point clouds are obtained by scanning N manufactured items that are obtained by sampling n manufactured items at regular intervals during a manufactured item production schedule, wherein n is a positive integer.

9. The system as described in claim 7, further comprising a coloration module operable to compare a deviation value of each point of the at least one fitted outline with a predetermined color range, and colorize each point of the at least one outline according to the comparison.

* * * * *